United States Patent [19]

Musser et al.

[11] Patent Number: 4,467,590
[45] Date of Patent: Aug. 28, 1984

[54] DRIVE REVERSING MECHANISM

[75] Inventors: Glenn A. Musser; James W. McDuffie, both of New Holland; Richard A. Pucher, Leola; Lloyd W. Redding, Lancaster; T. William Waldrop, New Holland, all of Pa.

[73] Assignee: Sperry Corporation, New Holland, Pa.

[21] Appl. No.: 560,650

[22] Filed: Dec. 12, 1983

[51] Int. Cl.³ .................................................. A01D 69/08
[52] U.S. Cl. ......................................... 56/11.2; 56/11.9
[58] Field of Search .................... 56/11.2, 11.7, 10.8, 56/11.9; 74/792, 750 R

[56] References Cited

U.S. PATENT DOCUMENTS

4,218,864  8/1980  Allemeersch ..................... 56/11.2

Primary Examiner—J. N. Eskovitz
Attorney, Agent, or Firm—Larry W. Miller; Frank A. Seemar; Darrell F. Marquette

[57] ABSTRACT

A hydraulically driven drive reversing mechanism, attachable to a combine to reverse the drive to the header and feeder house components, is disclosed wherein the reversing mechanism is contained within a gearbox detachably connected with the header drive shaft. The reversing mechanism is substantially self-contained within the gearbox and connectable to a source of hydraulic power to provide an optional drive reversing capability for substantially any combine. The reversing mechanism includes a first gear splined onto the header drive shaft for rotation therewith, a second free wheeling gear mounted within the gearbox in an intermeshing relationship with the first gear for rotation therewith and a clutch selectively engageable with the second gear to transfer rotational power from a hydraulic motor to affect a rotation of the header drive shaft in a reverse direction.

25 Claims, 9 Drawing Figures

DRIVE REVERSING MECHANISM

BACKGROUND OF THE INVENTION

The present invention relates generally to combine headers and feeder houses and, more particularly, to a drive reversing mechanism for reversing the movement of the driven components of the header harvesting mechanism and the feeder house conveyor.

Crop harvesting machines, such as combines, include harvesting mechanisms disposed on forwardly mounted headers to engage crop material on the ground and initiate the crop harvesting process. Combines are provided with conveyors housed within a hollow feeder housing to transfer severed crop material from the header to a threshing mechanism mounted in the base unit. Under certain crop conditions, one or more of the harvesting mechanisms or the conveyor can become plugged with crop material, halting the operation of the entire crop harvesting machine. By reversing the direction of the drive to these harvesting components, they can be operated in reverse to discharge the crop material toward the ground, thereby unplugging the machine in a simple and effective manner to permit a continued harvesting operation.

Various attempts have been made at providing a drive reversing mechanism for crop harvesting machines, such as found in U.S. Pat. Nos. 4,138,837 and 4,218,864, for example. However, these mechanism are not easily adapted to a variety of different combines or other harvesting machines; they cannot be quickly and easily "rocked", i.e., rapidly switched between forward and reverse directions; and they do not attach to the crop harvesting machine to become an integral part of the drive line to reverse the operation of both the header harvesting components and the feeder house conveyor.

SUMMARY OF THE INVENTION

It is an object of this invention to overcome the aforementioned disadvantages of the prior art by providing a drive reversing mechanism engageable with the header drive shaft to selectively reverse the operation of the header and feeder house conveyor.

It is another object of this invention to provide a drive reversing mechanism to permit a rocking of the header harvesting components and the feeder house conveyor between forward and reverse directions.

It is still another object of this invention to provide a drive reversing mechanism that is contained within gearbox that can be optionally attached to the header drive shaft.

It is a feature of this invention that the drive reversing mechanism can be included on a crop harvesting machine as an optional attachment.

It is an advantage of this invention that the drive reversing mechanism can be utilized on a variety of models of crop harvesting machines.

It is another feature of this invention that the drive reversing mechanism is hydraulically driven.

It is yet anonther object of this invention to provide the capability of unplugging the threshing mechanism when the primary drive can no longer operatively drive the threshing mechanism.

It is still another feature of this invention that the drive reversing mechanism incorporates a clutch device for transferring rotational power from a hydraulic motor to a series of gears to transfer reverse driving power to the header drive shaft.

It is another advantage of this invention that the drive reversing mechanism can be quickly and easily disconnected from the crop harvesting machine for convenient service and repair.

It is a further feature of this invention that the drive reversing mechanism reverses the operation of both the header and the feeder house conveyor.

It is yet another feature of this invention that the slow speed of the operation of the hydraulically driven drive reversing mechanism can be utilized to facilitate the installation of the feeder house conveyor.

It is a further object of this invention that the drive reverser can be used to slowly feed a slug of crop material into the threshing mechanism.

It is yet another advantage of this invention that the drive reversing mechanism can be operated even when the threshing mechanism is plugged, thereby preventing operation of the primary drive.

It is a further object of this invention to provide a drive reversing mechanism for a crop harvesting machine which is durable in construction, inexpensive of manufacture, carefree of maintenance, facile in assemblage, and simple and effective in use.

These and other objects, features and advantages are accomplished according to the instant invention by providing a hydraulically driven drive reversing mechanism, attachable to a combine to reverse the drive to the header and feeder house components, wherein the reversing mechanism is contained within a gearbox detachably connected with the header drive shaft. The reversing mechanism is substantially self-contained within the gearbox and connectable to a source of hydraulic power to provide an optional drive reversing capability for substantially any combine. The reversing mechanism includes a first gear splined onto the header drive shaft for rotation therewith, a second free wheeling gear mounted within the gearbox in an intermeshing relationship with the first gear for rotation therewith and a clutch selectively engageable with the second gear to transfer rotational power from a hydraulic motor to affect a rotation of the header drive shaft in a reverse direction.

BRIEF DESCRIPTION OF THE DRAWINGS

The advantages of this invention will become apparent under consideration of the following detailed disclosure of the invention, especially when taken in conjunction with the accompanying drawings wherein.

DETAILED DESCRIPTION OF THE PREFERRED EMBODIMENT

Figure 1:
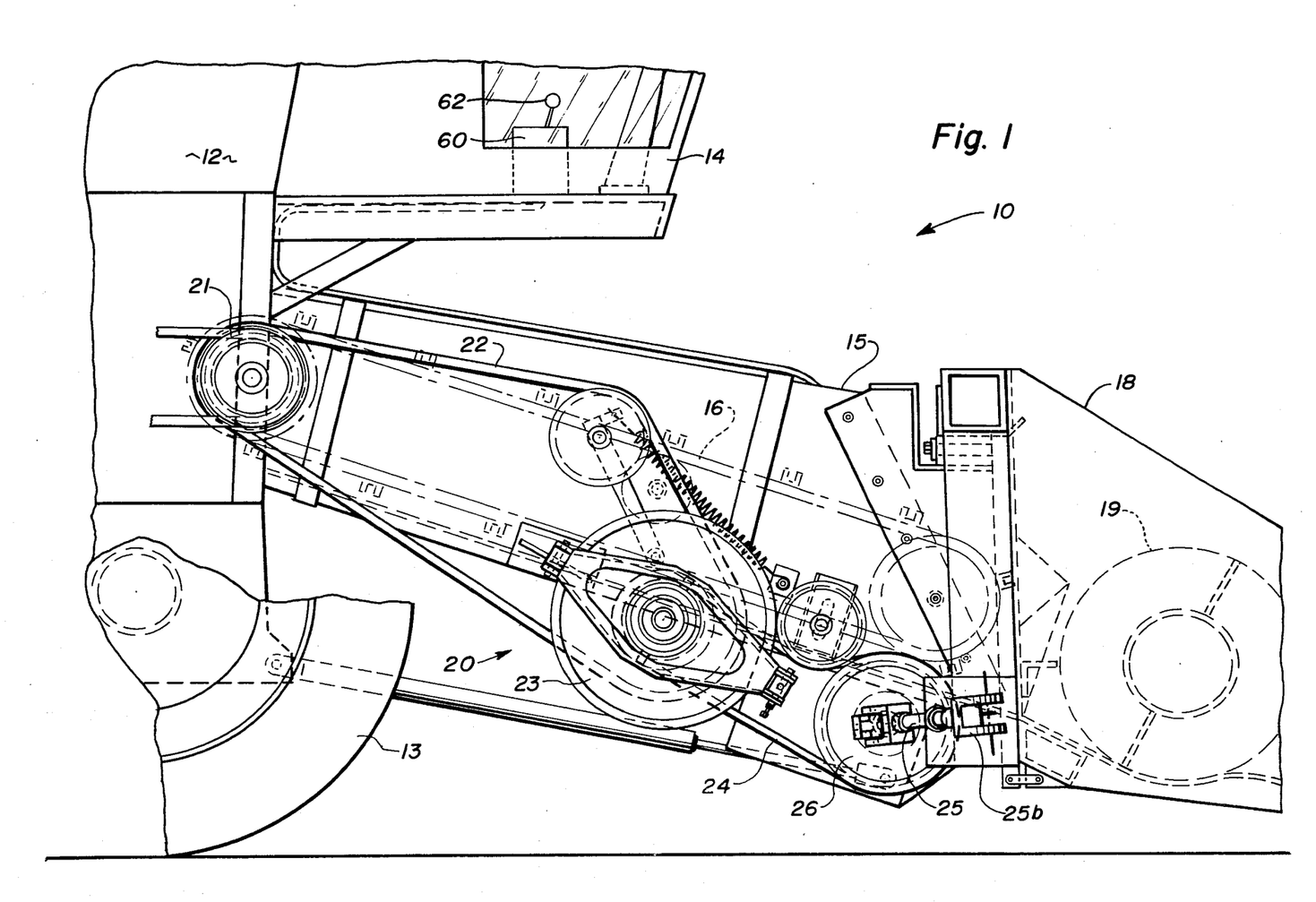
FIG. 1 is a partial right side elevational view of a crop harvesting machine, commonly referred to as a combine, incorporating the principles of the instant invention.

Referring now to the drawings, and particularly, to FIG. 1, a partial right side elevational view of a crop harvesting machine, commonly referred to as a combine, can be seen. Any left and right references are used as a matter of convenience and are determined by standing at the rear of the machine, facing the forward end, the direction of travel. The combine 10 includes a base unit 12 having a wheeled frame 13 mobilely supporting the combine 10 over a field. An operator's platform 14 is mounted on the base unit 12 in a conventional position to observe the harvesting operation taking forth below him. A feeder house 15 having a conventional chain and slat conveyor 16 rotatably housed therewithin is mounted on the base unit 12 to convey severed crop material to a conventional threshing mechanism (not shown) housed within the base unit 12. A crop harvesting header 18 is forwardly mounted on the feeder house 15 to gather crop material from the field and initiate the crop harvesting process. As is well known in the art, the header 18 can include a number of harvesting components, such as a cutterbar (not shown) for severing standing crop material, a reel (not shown) for conveying crop material rearwardly into the header and an auger 19 for consolidating the severed crop material and discharging it into the feeder house 15 for engagement by the conveyor 16.

Figure 2:
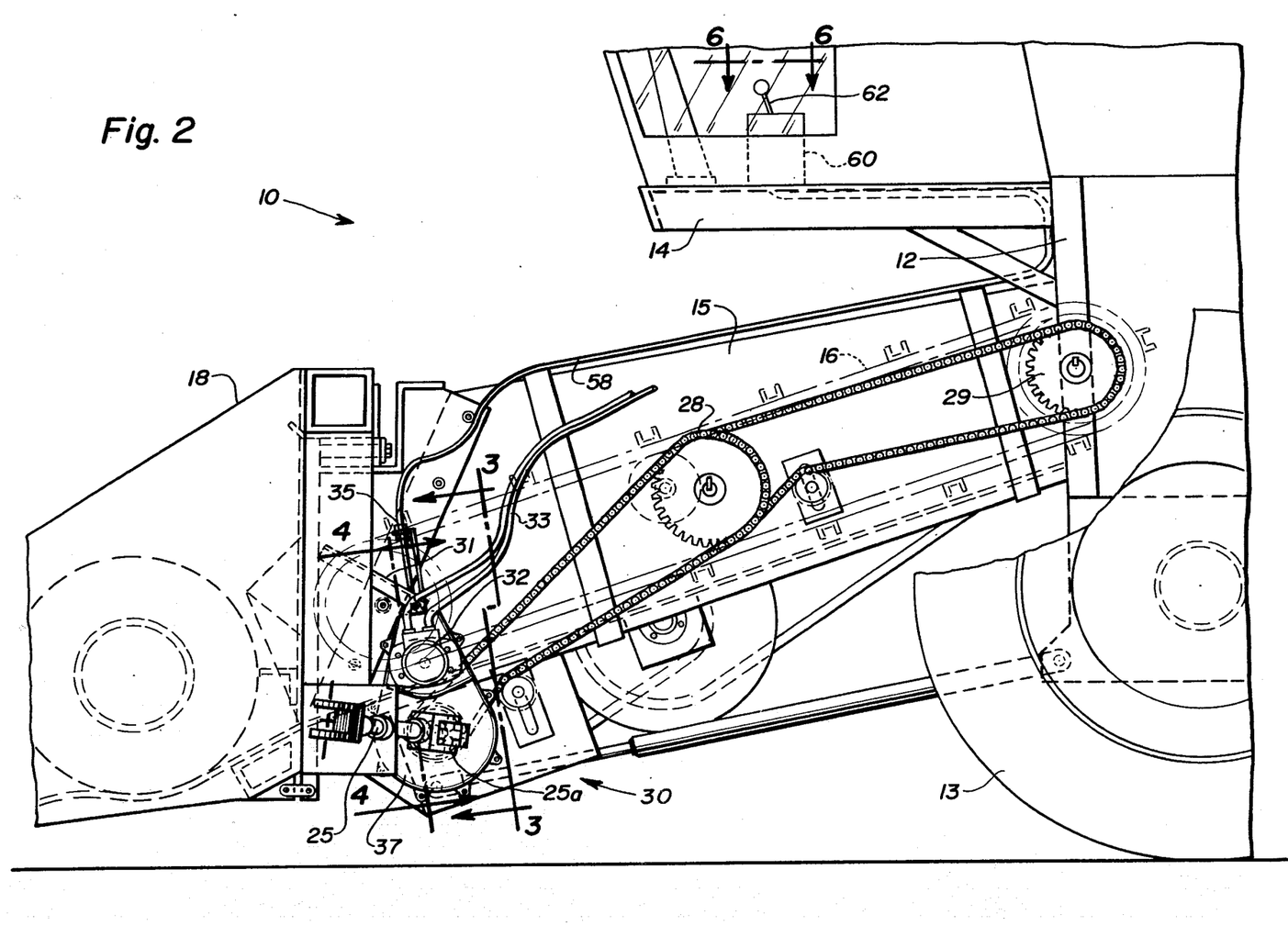
FIG. 2 is a partial left side elevational view of the combine seen in FIG. 1.
Figure 3:
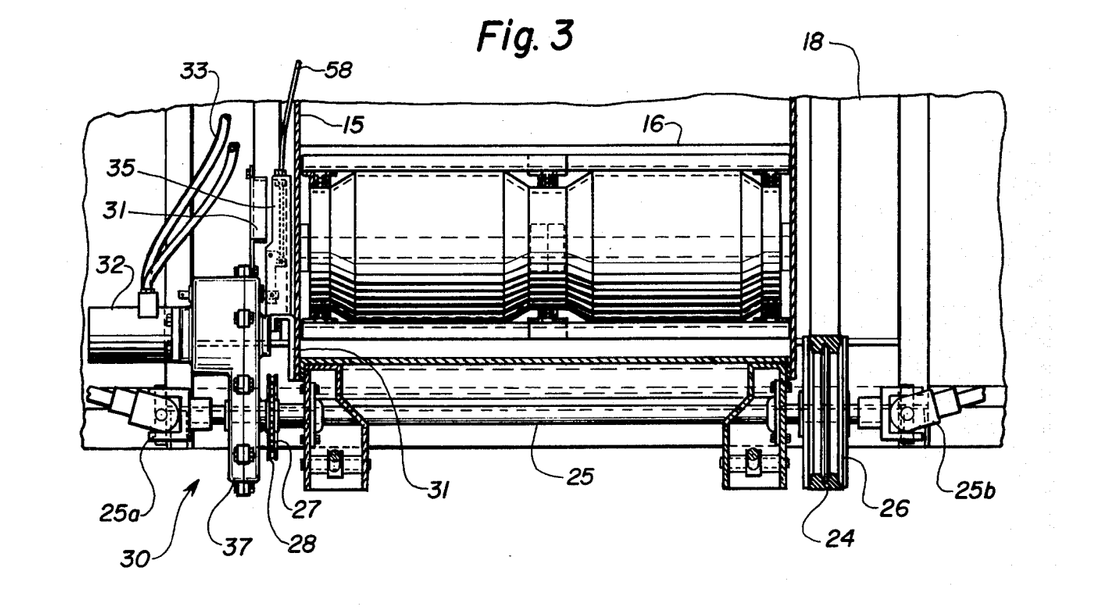
FIG. 3 is a partial cross-sectional view taken along lines 3—3 of FIG. 2, showing the backside of the drive reversing mechanism.

To drive the various header harvesting components and the feeder house conveyor 16, a drive line 20 is provided. As seen in FIG. 1, the base unit 12 is provided with a source of rotational power 21 operably driven by a power plant (not shown) supported on the frame 13. A first drive belt 22 transfers rotational power from the rotated pulley 21 to a vari-drive sheave 23 mounted on the right side of the feeder house 15. By controlling the effective diameter of the vary drive sheave 23, a variable speed output can be obtained from a generally fixed input speed. Accordingly, a second drive belt 24 transfers power from the vari-drive sheave 23 to a pulley 26 affixed to the header drive shaft 25. As can be seen in FIGS. 1-3, the header drive shaft 25 extends outwardly to both the left and right sides of the header 18 to appropriately drive header harvesting components.

As is best seen in FIGS. 2 and 3, the header drive shaft extends through or beneath the feeder house 15 to project beyond the left side of the feeder house 15. Mounted on the header drive shaft 25 is a sprocket 27 which serves to drive the conveyor 16 through the use of the endless chains 28 delivering rotational power to the sprocket 29 operatively connected to the conveyor 16. The header drive shaft 25 includes universal joints 25a and 25b disposed on either side of the feeder house 15 to accommodate misalignment of the angles of the drive shaft 25 in transferring rotational power to the header harvesting components. One skilled in the art will readily realize that the drive shaft 25 can be disassembled in a conventional manner at the location of these universal joints 25a, 25b.

Mounted to the left side of the feeder house by brackets 31 and splined onto the drive shaft 25 is the drive reversing mechanism 30, driven by a hydraulic motor 32 connectable by hoses 33 to a conventional source of hydraulic power mounted on the base unit 12. By disassembly of the header drive shaft 25 at the universal joint 25a, the reversing mechanism 30 can be selectively installed and/or removed from the combine 10 as a self-contained optional piece of equipment. As will be described in further detail below, the control linkage 35 for actuating and controlling the operation of the drive reversing mechanism 30 extends from the reversing mechanism 30 along the feeder house 15 to the operator's platform 14 and is connected to the control box 60.

Figure 4:
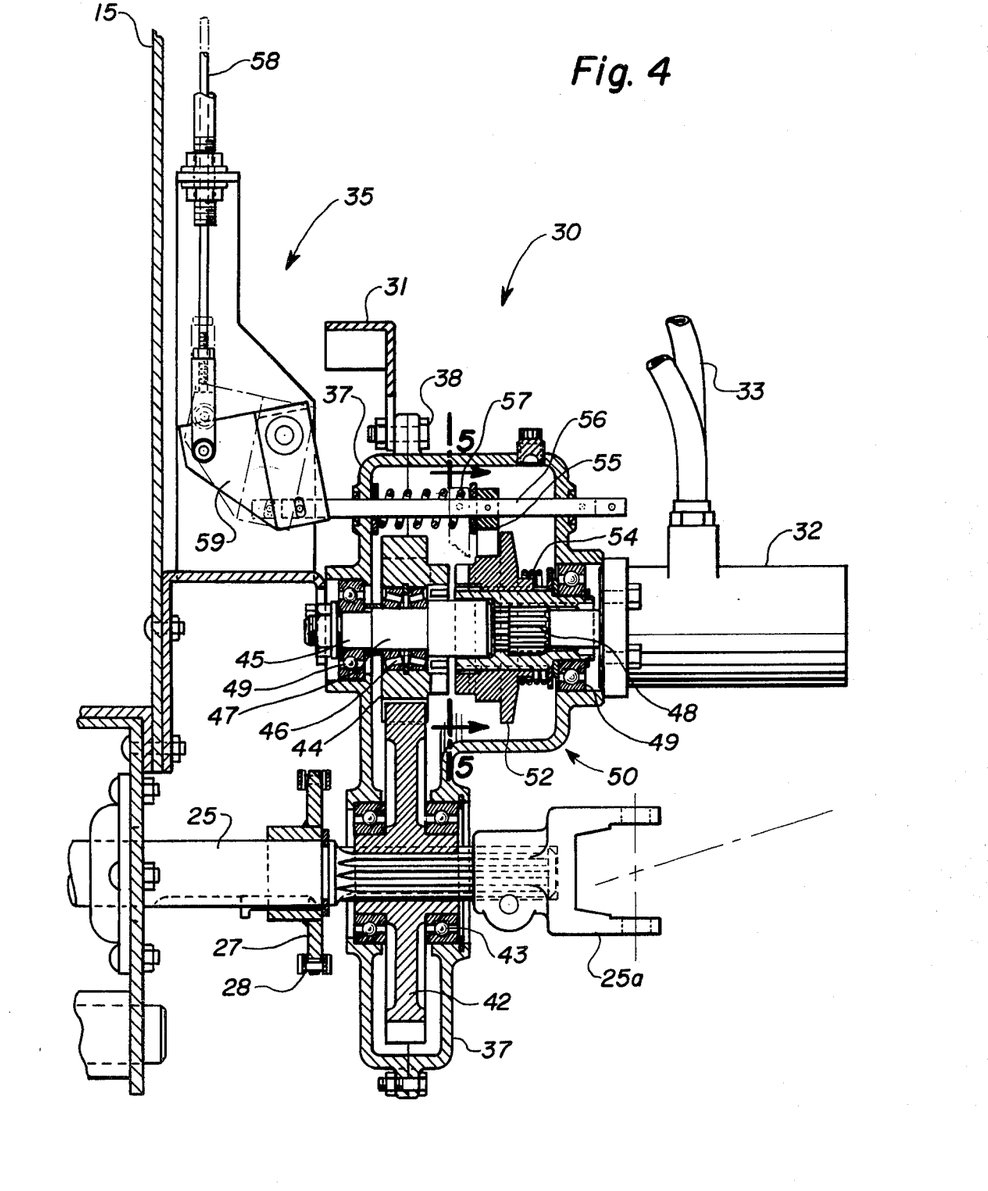
FIG. 4 is an enlarged cross-sectional view taken along lines 4—4 of FIG. 2 through the gearbox of the drive reversing mechanism.

As is best seen in the cross-sectional view of FIG. 4, the drive reversing mechanism 30 is generally contained within a gearbox 37 adapted for connection by bolts 38 to the mounting brackets 31. A first gear 42 is splined onto the drive shaft 25 and rotatably mounted within the casing 37 by bearings 43 so that the first gear 42 is rotatable with the header drive shaft 25, even during normal operation of the header harvesting components. A second gear 44 is rotatably mounted on a stub shaft 45 by bearings 46 for rotation independently of the stub shaft 45. The second gear 44 is positioned in intermeshing relationship with the first gear 42 so as to be rotatable with the header drive shaft 25 and the first gear 42 even during normal operation of the harvesting components. The stub shaft 45 includes a smooth portion 47 on which the second gear 44 is mounted and a splined portion 48. The stub shaft 45 is rotatably mounted within the gearbox 37 by bearings 49 and connected to the hydraulic motor 32 to form an operative extension of the driven shaft 34 of the motor 32 for powering the operation of the drive reversing mechanism 30.

Figure 5:
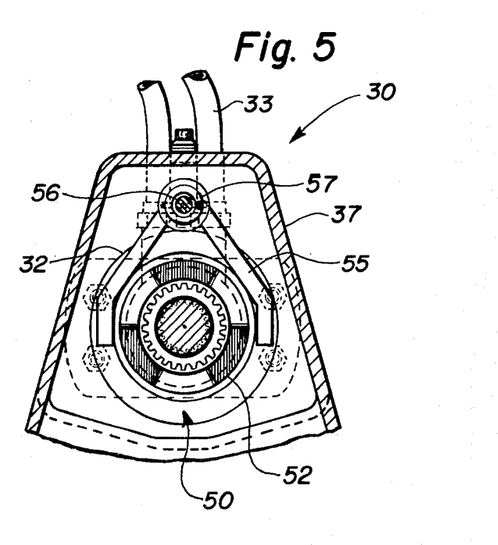
FIG. 5 is a cross-sectional view, showing the clutch mechanism, taken along lines 5—5 of FIG. 4.
Figure 6:
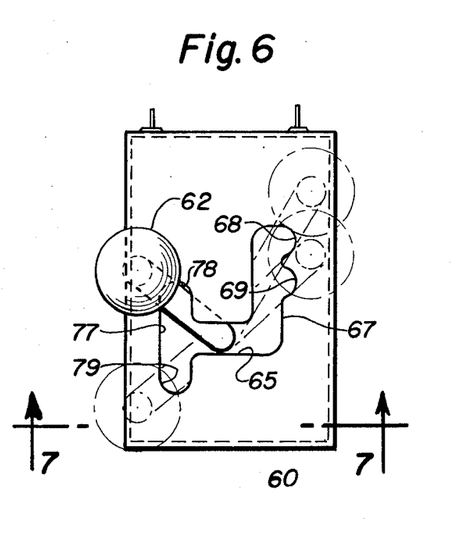
FIG. 6 is a top plan view of the control box for operating the drive reversing mechanism taken along lines 6—6 of FIG. 2.

Referring now to FIGS. 4 and 5, clutch 50 is mounted on the splined portion 48 of the stub shaft 45 to be rotatable therewith. The clutch 50 includes a jaw member 52 slidably movable on the splined portion 48 along the axis of the stub shaft 45 to be selectively engageable with the second gear 44, which is adapted for a driven engagement with the jaw member 52. An axially mounted spring 54 urges the jaw member 52 toward engagement with the second gear 44. Movement of the jaw member 52 toward the second gear 44 is controlled through the actuating linkage 35. A yoke 55 is engaged with the jaw member 52 and connected to a push rod 56 slidably received within the gear box 37. An actuating spring 57 urges the push rod 56 and yoke 55 in a direction to push the jaw member 52 away from the second gear 44. Since the actuating spring 57 is stronger than the clutch spring 54, the jaw member 52 will remain disengaged from the second gear 44 until the spring 57 is compressed through manipulation by an external force permitting the spring 54 to engage the jaw member 52 with the second gear 44. Movement of the yoke 55 and jaw member 52 is then controlled by the cable 58 extending into the operator's cab from a pivot member 59 interconnecting the cable 58 and the push rod 56 to translate movement of the cable 58 into a corresponding linear movement of the push rod 56, as shown in phantom in FIG. 4.

To prevent engagement of the drive reversing mechanism, i.e., preventing the clutch 50 from engaging the second gear 44, while the header drive shaft 25 is being driven from the primary drive 21 on the base unit 12, the actuating linkage 35 is interconnected with the control for engaging primary drive 21. As seen in FIGS. 6-9, the cable 58 is connected to a control box 60 in the operator's platform 14. The control box 60 is provided with a control lever 62 movable in a pattern defined by the slot 65. The control lever 62 is attached to a generally horizontally positioned pivot 71 mounted on a U-shaped bracket 72. The pivot 71 permits a movement of the lever 62 along one direction between quadrant 67 and quadrant 77 of the slot 65 as shown in phantom in FIG. 7. The U-shaped bracket 72 is swivelly mounted to the control box 60 by a swivel 73 to permit movement of the control lever 62 between notches 68,69,78,79 within quadrants 67 and 77 in a second direction perpendicular to the first direction, as shown in phantom in FIG. 8.

Figure 7:
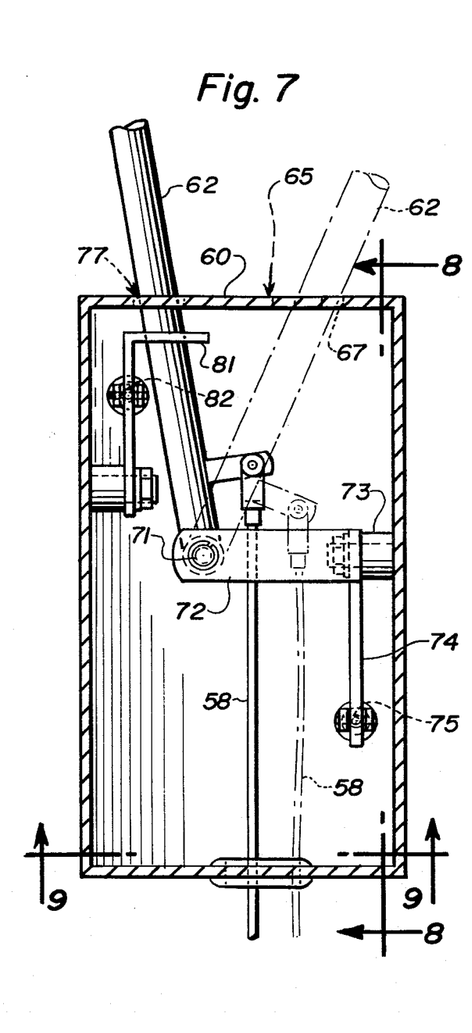
FIG. 7 is a cross-sectional view of the control box shown in FIG. 6, taken along lines 7—7, movement of the control lever being shown in phantom.
Figure 8:
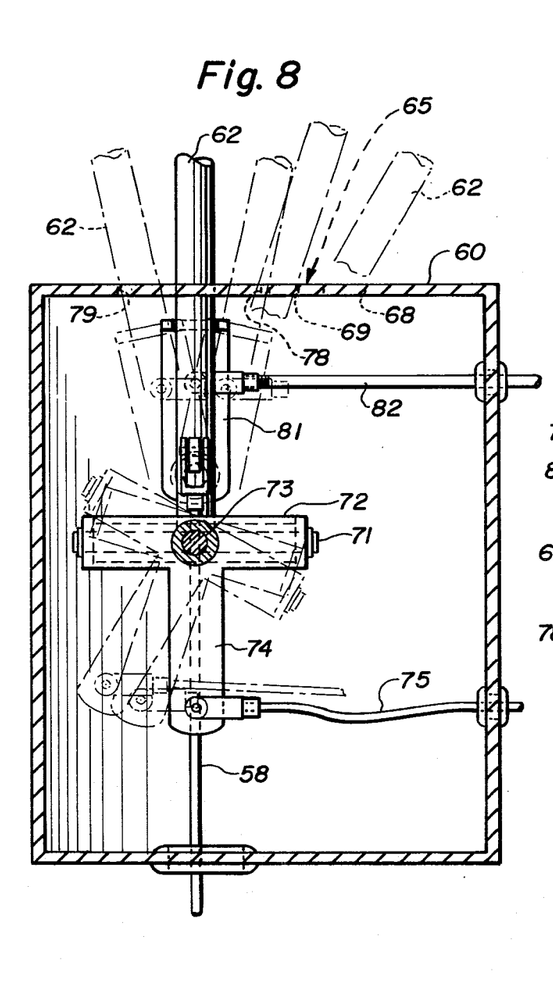
FIG. 8 is a cross-sectional view of the control box taken along lines 8—8 of FIG. 7, movement of the control lever and connected linkage being shown in phantom.
Figure 9:
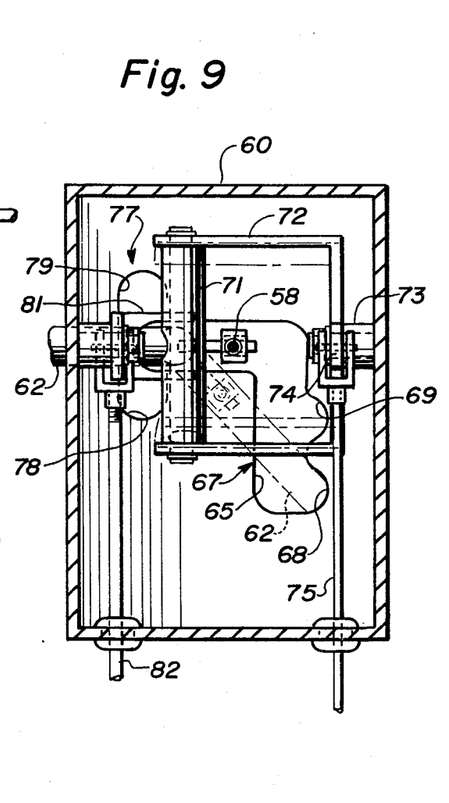
FIG. 9 is a cross-sectional view of the control box taken along lines 9—9 of FIG. 7 looking toward the top of the control box.

Movement of the lever 62 along the second direction within quadrant 67 of slot 65 controls the engagement of the primary drive 21 to power the normal rotation of the header drive shaft 25 and the operation of the various harvesting components. Positioning of the lever 62 into notch 68 rotates the bracket 72 about the swivel 73 and effects a pulling of control cable 75 attached to the tab 74 for conventionally operating a clutch (not shown) to engage the primary drive 21 and stops the transfer of rotational power to the header drive shaft 25. To engage the drive reversing mechanism 30, the lever 62 is pivotally moved in the first direction about the pivot 71 to position the lever 62 from quadrant 67 of slot 65 to quadrant 77, pulling on the actuating cable 58 to engage the clutch 50 with the second gear 44 within the gear casing 37 as is described above.

Once the control lever 62 has been moved to quadrant 77 of slot 65, the drive reversing mechanism 30 has been readied for operation. The clutch 50 is engaged with the second gear 44 and the primary drive 21 has been disengaged. Positioning of the lever 62 in quadrant 77 places the lever 62 within a forked bracket 81. A control rod 82 interconnects the forked bracket 81 and a conventional hydraulic valve (not shown) to control the flow of hydraulic fluid to the hydraulic motor 32. Movement of the lever 62 to notch 78 effects a driving of the motor 32 to rotate the drive shaft 25 in a normal direction, i.e., the same direction as when powered by the primary drive 21. Movement of the lever 62 to notch 79 reverses the direction of fluid flow to the motor 32 to power the rotation of the drive shaft in a reverse direction opposite to the normal direction of rotation, thereby powering the reverse operation of the header harvesting components and the feeder house conveyor 16.

Since the clutch 50 is engaged with the second gear 44 when the control lever 62 is moved to quadrant 77 of the slot 65, driving the reversing mechanism 30 in either forward or reverse directions is simply a matter of manipulating the hydraulic valve (not shown) to control the direction of fluid flow through the hydraulic motor 32. Accordingly, a "rocking" of the drive shaft 25, i.e., a switching back and forth of the direction of rotation of the drive shaft 25, to rock the conveyor 16 and the various header harvesting components to facilitate the dislodging of a plugged component, can be easily accomplished by moving the control lever 62 between notches 78 and 79.

As is noted above and best shown in FIG. 8, a positioning of the control lever 62 from notch 68 to notch 69 permits the cable 75 to go slack and disengage the primary drive 21 in a conventional manner. The cable 75 is situated such that it is necessary to move the control lever 62 as far as notch 68 to cause the primary drive 21 to be engaged. With respect to the amount of pull applied to cable 75, movement of the control lever 62 between notches 78 and 79 leaves the cable 75 in a slack condition and does not effect an actuation of the primary drive 21. Hence, the primary drive 21 cannot be actuated while the drive reversing mechanism 30 is engaged and/or operated.

Since the drive reversing mechanism 30 is essentially a self-contained unit, the mechanism 30 can be installed as an option to almost any crop harvesting machine. Disconnection of the drive shaft 25 at the universal joint 25a permits the casing 37 to be slid onto the drive shaft 25 and attached to brackets 31 to support the mechanism 30 from the feeder house 15. After appropriate connection of the hydraulic hoses 33 and the actuating linkage 35 and a reconnection of the universal joint 25a, the drive reversing mechanism 30 is ready for operation. Movement of the control lever 62 to affect a pulling on the cable 58 permits the jaw member 52 to slide along the axis of the stub shaft 45 into engagement with the second gear 44. A powered rotation of the stub shaft 45 by the motor 32 causes the jaw member 52 to rotate, transferring rotational power to the second gear 44, which in turn powers the rotation of the first gear 42 and the header drive shaft 25 splined thereto. Since the conveyor 16 is operatively powered from sprocket 27 mounted on the drive shaft 25, the drive reversing mechanism 30 will also power the reversing of the movement of the conveyor 16 to discharge crop material therein back toward the header 18. One skilled in the art will readily realize the applicability of this self-contained drive reversing mechanism to other types of crop harvesting machinery.

One skilled in the art will further realize that this drive reversing mechanism can be used to unplug the threshing mechanism if the drive train from the feeder house back to the threshing mechanism is unbroken. Generally, the primary drive is inoperative to drive any harvesting component, including the thresher, if the thresher becomes plugged. This drive reversing mechanism can not only be used to unplug the thresher but also can be used to slowly inch a slug of crop into the threshing unit. Furthermore, the slow speed of the hydraulic drive of the drive reversing mechanism can be used to aid in the installation of the feeder house conveyor by slowly feeding the chain around the sprockets. One skilled in the art will also realize that a chain drive could be utilized in the gear box 37 in the place of intermeshing gears 42,44 as operational equivalents thereof. The following claims are specifically intended to cover such equivalent structure.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A drive reversing mechanism for a crop harvesting machine having a base power unit, a crop harvesting attachment mounted on the base unit, and a drive line, including a rotatable drive shaft, operatively interconnecting the base unit and the attachment for powering the operation thereof, comprising:
   a casing having first opening therethrough, said casing being positionable such that said drive shaft passes through said first opening;
   a first power transfer means rotatably mounting within said casing and affixed to said drive shaft to be rotatable therewith in a normal direction of rotation;
   a second power transfer means rotatably mounted within said casing in operative communication with said first power transfer means to be rotatable therewith;
   power means mounted on said casing for providing a source of rotational power in a reverse direction of rotation opposite to said normal direction of rotation; and
   clutching means interconnecting said second power transfer means and said power means for selectively operatively engaging said power means with said second power transfer means to effect a rotation of said first power transfer means and said drive shaft in said reverse direction.

2. The drive reversing mechanism of claim 1 wherein said power means can provide a source of rotational power in both said normal and reverse directions.

3. The drive reversing mechanism of claim 2 wherein said first and said second power transfer means are gears intermeshed with each other for the transfer of rotational power therebetween.

4. The drive reversing mechanism of claim 3 wherein said second gear is rotatably mounted on a stub shaft connected to said power means.

5. The drive reversing mechanism of claim 4 wherein said stub shaft has a smooth portion on which said second gear is rotatably mounted and a spline portion on which said clutching means is mounted for rotation with said clutching means.

6. The drive reversing mechanism of claim 5 wherein said clutching means includes a jaw clutch member slidably received on said spline portion for linear movement along the axis of said stub shaft to engage said second gear and transfer rotational power thereto from said power means.

7. The drive reversing mechanism of claim 6 further comprising an actuation means operatively connected to said jaw clutch member to control the sliding movement thereof along the axis of said stub shaft.

8. The drive reversing mechanism of claim 7 wherein said second gear is rotatable independently of said stub shaft.

9. The drive reversing mechanism of claim 8 wherein said actuation means includes a first spring coaxially mounted on said stub shaft to urge said jaw clutch member toward said second gear and a cable actuated yoke assembly in operative communication with said jaw clutch member to control the movement of said jaw clutch member along said stub shaft toward and away from said second gear.

10. The drive reversing mechanism of claim 9 wherein said yoke assembly includes a actuating rod connected to a yoke engaged with said jaw clutch member, said actuating rod being biased by a second spring in such a manner as to urge said jaw clutch member away from said second gear, said second spring being stronger than said first spring.

11. The drive reversing mechanism of claim 10 wherein said power means comprises a hydraulically driven motor.

12. A combine for harvesting crop material from a field, comprising:
   a mobile base unit having a source of rotational power, a source of hydraulic power and means for threshing crop material mounted therein;
   a hollow feeder house mounted on said base unit and having a conveyor mounted therein to convey crop material therethrough to said means for threshing;
   a crop gathering header mounted on said feeder house and having means for collecting crop material and discharging the collected crop into said feeder house to be conveyed to said threshing means;
   drive transfer means mounted on said feeder house for transferring rotational power from said source of rotational power to operatively power said header, said drive transfer means including a drive shaft rotatably mounted for rotation in a normal direction for powering said header; and
   a hydraulically driven drive reversing mechanism connected to said drive shaft for selectively powering the rotation of said drive shaft in a reverse direction opposite to said normal direction to drive said header in reverse.

13. The combine of claim 12 wherein said drive reversing mechanism is housed within a gear box that is disconnectable from said drive shaft so that said drive reversing mechanism can be removed from said combine.

14. The combine of claim 13 wherein said drive reversing mechanism further includes:
   a first gear rotatably mounted within said gearbox, said first gear being connected to said drive shaft to be rotatable therewith;
   a second gear rotatably mounted on a stub shaft within said gear box in an intermeshing relationship with said first gear;
   a clutch mounted on said stub shaft within said gearbox to be selectively engageable with said second gear; and
   a hydraulic motor drivingly connected to said clutch to power the rotation of said drive shaft when said clutch is engaged with said second gear, said hydraulic motor being connected to said source of hydraulic power.

15. The combine of claim 14 wherein said second gear is mounted for rotation independently of said stub shaft, said first and second gears being rotatable with said drive shaft.

16. The combine of claim 15 wherein said drive reversing mechanism further includes actuating means operatively connected to said clutch for effecting a selective engagement of said clutch with said second gear to permit said hydraulic motor to power the rotation of said drive shaft.

17. The combine of claim 16 wherein said conveyor is operatively driven from said drive shaft, said drive reversing mechanism being operable to power the reversing of both said header and said conveyor.

18. The combine of claim 17 wherein said hydraulic motor is operable to rotate said drive shaft in both said normal and reverse directions.

19. In a crop harvesting machine for harvesting crop material from a field, said crop harvesting machine having a mobile frame adapted for movement over the field; a header having harvesting means supported by said frame to gather crop material from the field and initiate the crop harvesting process; and drive means connectable to a source of rotational power for driving said harvesting means, said drive means including a drive shaft rotatable in a normal direction while operably driving said harvesting means to gather crop material from the field, the improvement comprising:

a drive reversing mechanism connected to said drive shaft for selectively rotating said drive shaft in a reverse direction opposite to said normal direction to reverse the movement of said harvesting means, said drive reversing mechanism being housed within a gearbox through which said drive shaft passes to permit a removal of said drive reversing mechanism from said crop harvesting machine as an intact unit, said drive reversing mechanism being connectable to a source of supplemental power to rotate said drive shaft after said drive means has been effectively disconnected from said source of rotational power.

20. The crop harvesting machine of claim 19 wherein said drive reversing mechanism is operable to rotate said drive shaft in both said normal and reverse directions to permit a rocking of the movements of said harvesting means.

21. The crop harvesting machine of claim 20 wherein said drive reversing mechanism includes:

a first gear rotatably mounted within said gearbox, said first gear encircling said drive shaft and rotatable therewith;

a second gear rotatably mounted on a stub shaft within said gear box in an intermeshing relationship with said first gear;

a clutch mounted on said stub shaft within said gearbox to be selectively engageable with said second gear;

a hydraulic motor drivingly connected to said clutch to power the rotation of said drive shaft when said clutch is engaged with said second gear, said hydraulic motor being connected to said source of supplemental power; and actuating means connected to said clutch to effect and control the engagement of said clutch with said second gear.

22. The crop harvesting machine of claim 21 wherein said second gear is mounted for rotation independently of said stub shaft, said first and second gears being rotatable with said drive shaft.

23. The crop harvesting machine of claim 22 wherein said clutch is slidable along said stub shaft upon actuation by said actuating means to engage said second gear for the rotatable driving thereof, said clutch including a clutch spring biasing said clutch toward engagement with said second gear, said actuating means including a cable actuated yoke engaged with said clutch to control the sliding movement thereof along said stub shaft and an actuating spring biasing said yoke to move said clutch away from engagement with said second gear, said actuating spring being stronger than said clutch spring, an appropriate application of external force through a cable connected to said yoke overcoming the biasing force exerted by said actuating spring to permit said clutch spring to slide said clutch into engagement with said second gear.

24. The crop harvesting machine of claim 23 further comprising:

a secondary harvesting mechanism mounted on said mobile frame for applying a further harvesting treatment to said initially harvested crop material; and a conveyor supported by said mobile frame in operative communication with both said header and said secondary harvesting mechanism to convey crop material from said header to said secondary harvesting mechanism.

25. The crop harvesting machine of claim 24 wherein said conveyor is driven from said drive shaft, the reversing of rotation of said drive shaft by said drive reversing mechanism causing said conveyor to convey crop material back toward said header.

* * * * *